US011474957B2

(12) United States Patent
Shaeffer et al.

(10) Patent No.: US 11,474,957 B2
(45) Date of Patent: *Oct. 18, 2022

(54) MEMORY ACCESS DURING MEMORY CALIBRATION

(71) Applicant: Rambus Inc., San Jose, CA (US)

(72) Inventors: Ian Shaeffer, Los Gatos, CA (US); Frederick A. Ware, Los Altos Hills, CA (US)

(73) Assignee: Rambus Inc., San Jose, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/022,746

(22) Filed: Sep. 16, 2020

(65) Prior Publication Data

US 2021/0064552 A1    Mar. 4, 2021

Related U.S. Application Data

(63) Continuation of application No. 16/266,526, filed on Feb. 4, 2019, now Pat. No. 10,810,139, which is a
(Continued)

(51) Int. Cl.
*G06F 12/14*    (2006.01)
*G06F 3/06*    (2006.01)
(Continued)

(52) U.S. Cl.
CPC ........ *G06F 12/1458* (2013.01); *G06F 3/0619* (2013.01); *G06F 12/023* (2013.01);
(Continued)

(58) Field of Classification Search
CPC .. G06F 12/1458; G06F 3/0619; G06F 12/023; G06F 13/16; G06F 13/1657;
(Continued)

(56) References Cited

U.S. PATENT DOCUMENTS 6,310,814 B1    10/2001    Hampel et al.
7,558,908 B2    7/2009    Bellows et al.
(Continued)

FOREIGN PATENT DOCUMENTS

WO    WO 2010/083073 A2    7/2010
WO    WO 2010/085405 A1    7/2010

OTHER PUBLICATIONS

PCT International Search Report and Written Opinion, PCT Application No. PCT/US2011/059550, dated Jun. 14, 2012, nine pages.

*Primary Examiner* — Francisco A Grullon
(74) *Attorney, Agent, or Firm* — Fenwick & West LLP

(57) ABSTRACT

A multi-rank memory system in which calibration operations are performed between a memory controller and one rank of memory while data is transferred between the controller and other ranks of memory. A memory controller performs a calibration operation that calibrates parameters pertaining to transmission of data via a first data bus between the memory controller and a memory device in a first rank of memory. While the controller performs the calibration operation, the controller also transfers data with a memory device in a second rank of memory via a second data bus.

20 Claims, 10 Drawing Sheets

Related U.S. Application Data continuation of application No. 15/485,115, filed on Apr. 11, 2017, now Pat. No. 10,210,102, which is a continuation of application No. 14/871,754, filed on Sep. 30, 2015, now Pat. No. 9,652,409, which is a continuation of application No. 13/883,542, filed as application No. PCT/US2011/059550 on Nov. 7, 2011, now Pat. No. 9,176,903.

(60) Provisional application No. 61/411,897, filed on Nov. 9, 2010.

(51) Int. Cl.
*G06F 13/16* (2006.01)
*G06F 12/02* (2006.01)

(52) U.S. Cl.
CPC .......... *G06F 13/16* (2013.01); *G06F 13/1657* (2013.01); *G06F 13/1684* (2013.01); *G06F 13/1694* (2013.01); *G06F 2212/1044* (2013.01); *G06F 2212/1052* (2013.01)

(58) Field of Classification Search
CPC ............. G06F 13/1684; G06F 13/1694; G06F 2212/1044; G06F 2212/1052
See application file for complete search history.

(56) References Cited

U.S. PATENT DOCUMENTS

| | | | |
|---|---|---|---|
| 7,707,366 B2 | 4/2010 | Tagawa | |
| 9,384,820 B1* | 7/2016 | Parik | G11C 11/40618 |
| 2002/0169922 A1 | 11/2002 | Thomann et al. | |
| 2005/0265102 A1* | 12/2005 | Remaklus, Jr. | G11C 11/40611 |
| | | | 365/222 |
| 2006/0106975 A1 | 5/2006 | Bellows et al. | |
| 2008/0168298 A1* | 7/2008 | Bellows | G11C 7/10 |
| | | | 711/E12.001 |
| 2008/0256282 A1 | 10/2008 | Guo et al. | |
| 2010/0162037 A1 | 6/2010 | Maule et al. | |
| 2014/0185403 A1* | 7/2014 | Lai | G11C 11/40618 |
| | | | 365/222 |
| 2019/0294348 A1* | 9/2019 | Ware | G11C 11/40618 |

\* cited by examiner

MEMORY ACCESS DURING MEMORY CALIBRATION

CROSS REFERENCE TO RELATED APPLICATIONS

This application is a continuation of U.S. patent application Ser. No. 16/266,526 filed on Feb. 4, 2019 which is a continuation of U.S. patent application Ser. No. 15/485,115 filed on Apr. 11, 2017 which is a continuation of U.S. patent application Ser. No. 14/871,754 filed on Sep. 30, 2015, which is a continuation of U.S. patent application Ser. No. 13/883,542 filed on May 3, 2013 and issued as U.S. Pat. No. 9,176,903, which is a national stage application of PCT Application No. PCT/US2011/059550 filed on Nov. 7, 2011, which claims priority from U.S. Provisional Patent Application No. 61/411,897 filed on Nov. 9, 2010, all of which are incorporated by reference herein in their entirety.

BACKGROUND

The present disclosure generally relates to memory systems, and memory controllers that control the operation of memory devices in such systems. Specific embodiments described herein refer to methods and apparatus for types of memory device access during calibration operations, as executed by a memory controller.

In multi-rank memory systems, memory devices are organized into two or more ranks of memory where each rank of memory devices is independently addressable by a memory controller. Memory controllers write data to and read data from the memory devices in a rank through a data bus. In multi-rank memory systems, data buses are a shared resource. For example, devices in separate memory ranks may be connected to and share a common data bus. The memory controller transfers data with one memory rank at a time through the data bus.

Signaling interfaces in the memory controller and memory devices are responsible for transmitting signals to and receiving signals from the data bus. Due to the high-frequency nature of modern memory signaling, these interfaces are sensitive to changes in voltage and temperature. The signaling interfaces can be periodically calibrated to compensate for such changes. In conventional multi-rank memory systems, the signaling interfaces are calibrated one rank at a time. However, calibration operations tie up an entire data bus and block data access to the memory devices of other ranks that are not being calibrated.

BRIEF DESCRIPTION OF THE DRAWINGS

The teachings of the embodiments herein can be readily understood by considering the following detailed description in conjunction with the accompanying drawings.

DETAILED DESCRIPTION OF EMBODIMENTS

Embodiments of the present disclosure include a multi-rank memory system in which a memory controller calibrates parameters pertaining to transmission of data via a first data bus between the memory controller and a memory device in a first rank of memory devices. While the memory controller performs the calibration operation, the memory controller also transfers (e.g., reads or writes) data with a memory device in a second rank of memory devices via a second data bus. The solutions provided by various embodiments may allow for calibration to occur in a multi-rank memory system without completely blocking data access to the other ranks that are not being calibrated. In example embodiments, the performance degradation associated with calibration in a multi-rank memory system is reduced.

Reference will now be made to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

Figure 1:
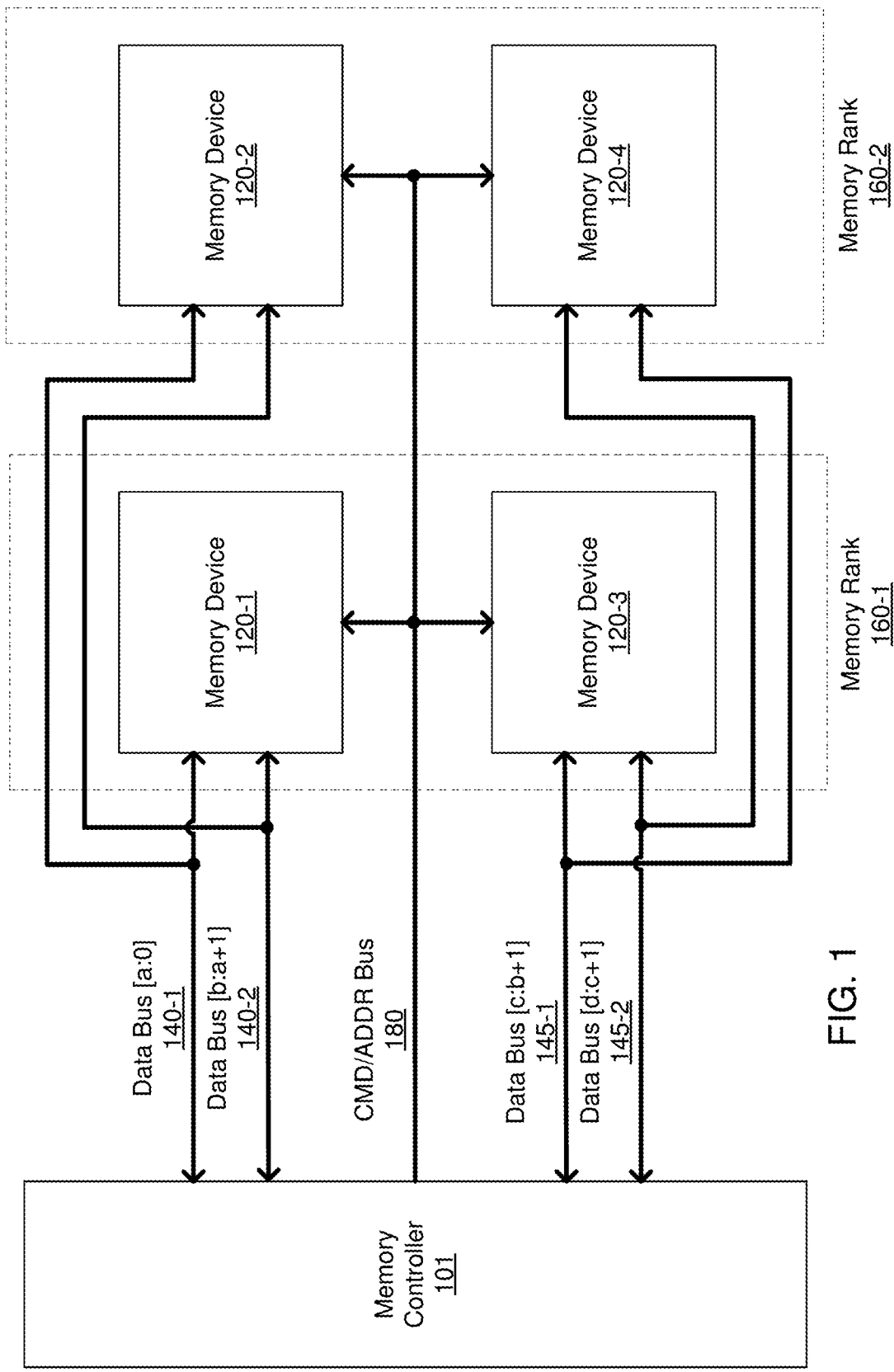
FIG. 1 illustrates a high-level overview of a memory system with multiple ranks of memory, according to one embodiment.

FIG. 1 illustrates high-level overview of a memory system with multiple ranks of memory devices, according to an embodiment. The memory system includes a memory controller 101 and multiple memory devices 120-1, 120-2, 120-3, 120-4 coupled to the memory controller 101 via data buses 140-1, 140-2, 145-1, 145-2 and CMD/ADDR bus 180. The memory devices are organized in a multi-rank configuration such that memory devices 120-1, 120-3 are part of memory rank 160-1 and memory devices 120-2, 120-4 are part of memory rank 160-2. The memory ranks 160-1, 160-2 may be, for example, ranks within a memory module such as a Dual Inline Memory Module (DIMM). Although FIG. 1 shows only two memory ranks and two memory devices in each memory rank, this is merely exemplary and in real memory systems there may be more than two memory ranks and each memory rank may have more than two memory devices.

The data buses 140, 145 are bidirectional data buses that convey data signals between the memory controller 101 and the memory devices 120. Data buses 140-1, 140-2 are coupled to both memory device 120-1 and memory device 120-2. Data buses 145-1, 145-2 are coupled to both memory device 120-3 and memory device 120-4. The data buses 140, 145 are shared such that only one memory device 120 coupled to a given data bus 140, 145 can transfer signals across the data bus 140, 145 at any given time. For example, if memory device 120-1 is transferring signals across data bus 140-1, memory device 120-2 cannot also transfer signals across data bus 140-1 at the same time.

When considered together, the individual data buses 140, 145 (as well as data buses for any additional memory devices that are not shown) form the full data bus of the memory system. Each data bus 140, 145 may have multiple wires or multiple pairs of wires to transmit multiple bits in parallel. For example, data bus 140-1 carries bits a:0, data bus 140-2 carries bits b:a+1, data bus 145-1 carries bits c:b+1, and data bus 145-2 carries bits d:c+1 of the full data bus. In one embodiment, each data bus 140, 145 corresponds to four bits of the full data bus. For example, data bus 140-1 corresponds to bits 3:0, data bus 140-2 corresponds to bits 7:4, data bus 145-1 corresponds to bits 11:8, and data bus 145-2 corresponds to bits 15:12. Alternatively, each data bus 140, 145 may be a serial bus having a single wire or pair of wires based on whether the data signals are common mode or differential signals.

As will be explained below, the memory controller 101 can perform a calibration operation that tunes transmission of data via a first data bus between the memory controller 101 and a memory device 120 in a first rank of memory devices. While the calibration is performed, the memory controller 101 can transfer data via a second data bus between the memory controller 101 and the same memory device 120 or between the memory controller and a memory device 120 in a different rank of memory. For example, memory controller 101 may send a command via command/address (CMD/ADDR) bus 180 that initiates a calibration operation that tunes transmission of data via data bus 140-1 between the controller 101 and memory device 120-1 in memory rank 160-1. The memory controller 101 then sends a second command via CMD/ADDR bus 180 for transferring data between the memory controller 101 and memory device 120-2 in memory rank 160-2 via a different data bus 140-2. Thus, the memory controller 101 can perform calibration operations without blocking data access to the memory devices 120-1, 120-2 that are coupled to the bus that the calibration operations are being performed on.

Figure 2:
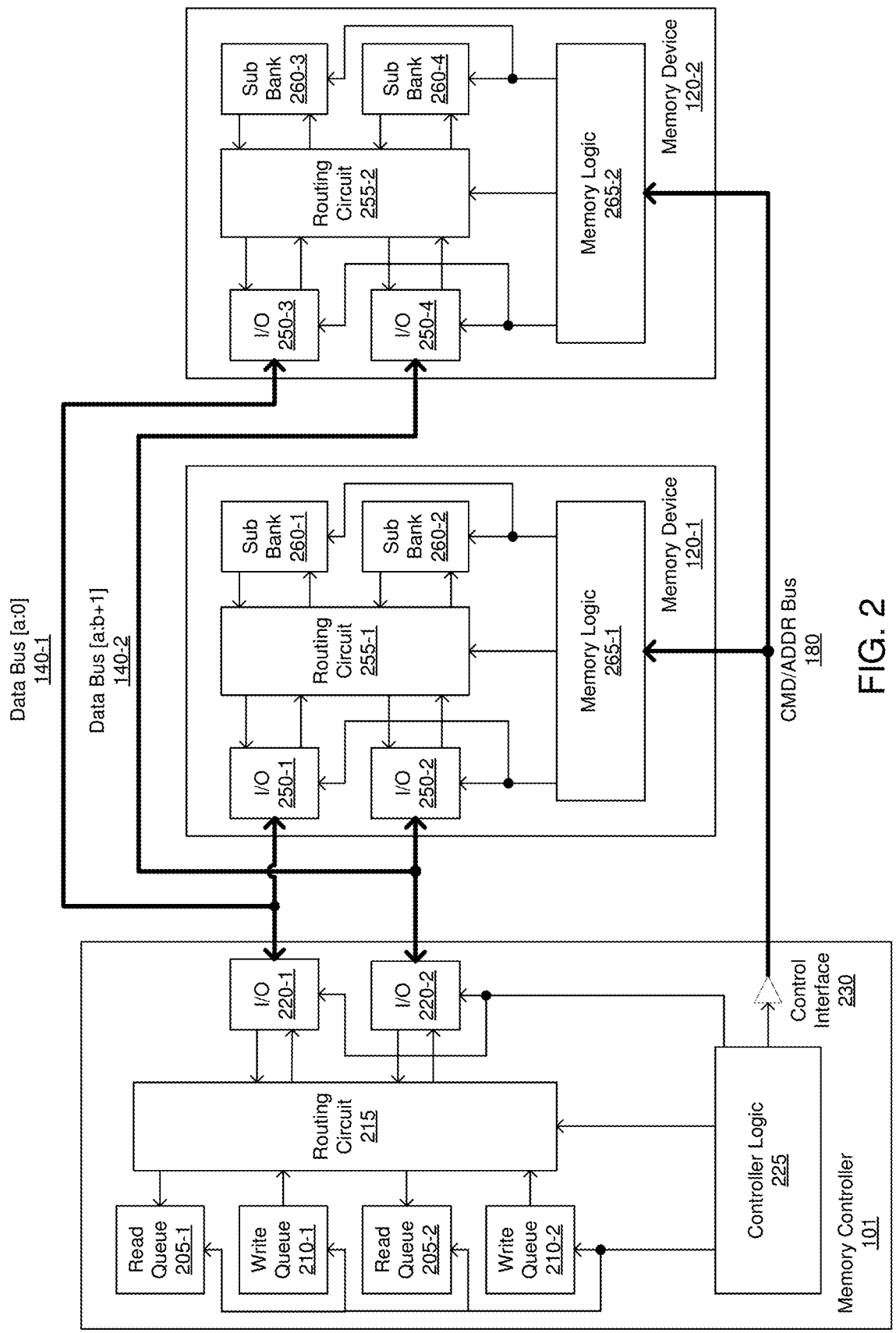
FIG. 2 illustrates a more detailed view of the memory system of FIG. 1, according to one embodiment.

FIG. 2 illustrates a more detailed view of the memory system of FIG. 1, according to one embodiment. Shown in the figure are the memory controller 101 and memory devices 120-1 and 120-2 from FIG. 1. For purposes of clarity, memory devices 120-3 and 120-4 are not shown in this figure. The configuration of memory devices 120-3, 120-4 is similar to the configuration of memory devices 120-1, 120-2.

Memory controller 101 includes multiple read queues 205-1, 205-2, multiple write queues 210-1, 210-2, a routing circuit 215, multiple input/output (I/O) data interface circuits 220-1, 220-2 (or PHYs; physical interface), controller logic 225, and a control interface 230. Memory device 120-1 includes multiple I/O interface circuits 250-1, 250-2, a routing circuit 255-1, multiple banks including sub-banks 260-1, 260-2, and memory logic 265-1. Similarly, memory device 120-2 also includes multiple I/O interface circuits 250-3, 250-4, a routing circuit 255-2, multiple banks including sub-banks 260-3, 260-4, and memory logic 265-2. In one embodiment, each memory device 120 has multiple memory banks, each of which is divided into sub-banks 260.

Controller I/O interface 220-1 is coupled to data bus 140-1, which is used to transmit data signals to and receive data signals from memory I/O interfaces 250-1, 250-3. Similarly, controller I/O interface 220-2 is coupled to data bus 140-2, which is used to transmit data signals to and receive data signals from memory I/O interfaces 250-2, 250-4. The I/O interfaces in both the memory controller 101 and the memory devices 120 contain circuitry that is adjusted or tuned in accordance with calibration parameters. The parameters can be stored in control registers (not shown) that are updated during a calibration operation. There are a plurality of interface parameters that can be calibrated. Example parameters include timing parameters such as receiver sample phase and transmitter drive phase, voltage parameters such as receiver offset or reference voltage, receiver current bias, receiver termination impedance, transmit supply voltage, transmit drive swing voltage, and transmit termination impedance.

In more detailed embodiments, the receiver sample phase is a parameter that affects the temporal position of a received signal relative to a timing reference or other signal; transmitter drive phase is a parameter that affects the temporal position of a transmitted signal relative to a timing reference or other signal; receiver offset is a parameter that adjusts the voltage level of a received signal; receiver reference voltage is an offset that adjusts a receiver reference voltage; receiver current bias is a parameter that adjusts the bias voltage and a current source for a receiver circuit; receiver termination impedance is a parameter that affects the impedance of a transmission line termination for a receiver circuit; transmit supply voltage is a parameter that affects the supply voltage for a driver used to transmit a signal; transmit drive swing voltage is a parameter that affects the voltage swing of a transmitted signal by a transmitter; and transmit termination impedance is a parameter that affects the impedance of a transmission line termination on the transmitter (or driver) circuit used to transmit a signal or the impedance of the transmitter itself.

The impedance of a transmission line termination on the receiver side may be controlled using on-die termination (ODT) resistors (not shown) that are included in the I/O interfaces 250 of the memory devices 120. During calibration operations, the memory controller 101 may adjust the ODT resistance in accordance with the receiver termination impedance parameter. The ODT resistance of the I/O interfaces 250 can be independently adjusted. For example, the ODT resistance of I/O interface 250-1 can be set differently than the ODT resistance of I/O interface 250-2. The ODT resistance can be independently controlled by connecting two sets of ODT control signals between the memory controller 101 and the memory devices 120. Alternatively, the ODT resistance can be independently controlled by bits in a command field received from the memory controller 101 via CMD/ADDR bus 180.

In one embodiment, the memory controller 101 calibrates the parameters by performing calibration operations to optimize the transfer of data signals between the I/O interfaces 220 of the memory controller 101 and the I/O interfaces 250 of the memory devices 120. For each data bus (e.g. data bus 140-1), the parameters affecting the I/O interfaces coupled to the data bus (e.g. I/O 220-1, 250-1, 250-3), are calibrated with respect to one memory device 120 at a time. For example, to completely calibrate parameters relating to transmission of data on data bus 140-1, parameters affecting I/O 220-1 and I/O 250-1 would be first calibrated as a pair. Then, parameters affecting I/O 220-1 and I/O 250-3 would be calibrated as a pair. In one embodiment, calibration operations are performed on a periodic basis to adjust for changes in conditions such as voltage and temperature. As used herein, "calibrating a data bus" means calibrating parameters relating to transmission (and/or reception) of data, for example, by interface circuits that transmit (and/or receive) the data via the data bus.

To calibrate a data bus, the memory controller 101 may send test patterns to a memory device (e.g., device 120-1) and receive responses to the test patterns from the memory device (e.g., device 120-1) via one of the data buses (e.g., data bus 140-1). As a result, calibration may temporarily remove a data bus (e.g., data bus 140-1) from service, for example, in the event that the data bus is involved in the calibration operation. The bus 140 that is removed from service cannot be used to transfer data between the memory controller 101 and the memory devices in other ranks of memory (e.g. device 120-2) until the calibration is complete.

Referring to memory devices 120-1, 120-2, each memory device has a plurality of sub-banks 260-1, 260-2, 260-3, 260-4. In the example of FIG. 2, memory device 120-1 includes sub-banks 260-1, 260-2, and memory device 120-2 includes sub-banks 260-3, 260-4. The sub-banks 260 can include Dynamic Random Access Memory (DRAM) cells, static random access memory (SRAM) cells or non-volatile memory such as flash memory cells. The memory controller 101 maps each sub-bank 260 to a physical sub-bank address and writes data into and reads data from storage locations in the sub-banks 260 based on the physical address of the sub-bank. In an embodiment, each sub-bank 260 is a half bank of memory. In another embodiment, each memory device 120 has a plurality of banks and each sub-bank 260 is a set of sub-banks that represents multiple sub-banks of memory. When considered together, all of the sub-banks within a single memory device (e.g. sub-banks 260-1, 260-2 of memory device 120-1) form the full memory core of a memory device.

In one embodiment, the sub-banks 260 of the memory devices 120 are micro-threaded. Micro-threaded sub-banks are independently addressable from other sub-banks. The memory controller 101 can send different commands to different sub-banks 260 such that each sub-bank 260 performs a different command. For example, sub-bank 260-1 may perform a data write transaction while sub-bank 260-2 performs a data read transaction. Alternatively, a single command may be addressed to and performed by more than one sub-bank 260.

In an embodiment, the memory controller 101 has a plurality of read queues 205-1, 205-2 and write queues 210-1, 210-2. The write queues 210 store data waiting for transmission to the memory devices 120 via data buses 140. The read queues 205 store data that is received from the memory devices 120 via data buses 140. In one embodiment, read queues 205 and write queues 210 store data corresponding to physical addresses that are mapped to a particular sub-bank 260. For example read queue 205-1 and write queue 210-1 may store data that corresponds to physical addresses mapped to sub-banks 260-1, 260-3. Read queue 205-2 and write queue 210-2 may store data that corresponds to physical addresses mapped to sub-banks 260-2, 260-4.

The controller routing circuit 215 is coupled to the read/write queues 205, 210 and the I/O interfaces 220. The routing circuit 215 can be configured by controller logic 225 to route signals between any of the read/write queues 205, 210 and any of the I/O interfaces 220 in the memory controller 101. Similarly, the routing circuit 255-1 in memory device 120-1 can be configured by memory logic 265-1 to route signals between any of sub-banks 260-1, 260-2 and I/O interfaces 250-1, 250-2. Routing circuit 255-2 can be configured by memory logic 265-2 to route signals between any of the sub-banks 260-3, 260-4 and I/O interfaces 250-3, 250-4. The routing circuits 215, 255 enable transfer of data between any read queue 205 or write queue 210 and any sub-bank 260 of memory devices 120-1, 120-2 via either data bus 140-1, 140-2. By properly configuring the routing circuits, the memory controller 101 can still access the full memory core (i.e., all sub-banks) of the memory devices 120-1, 120-2 even if one of the data buses 140-1, 140-2 is being used for calibration operations. Thus, the performance degradation associated with performing calibration operations in a multi-rank configuration is reduced.

Figure 3:
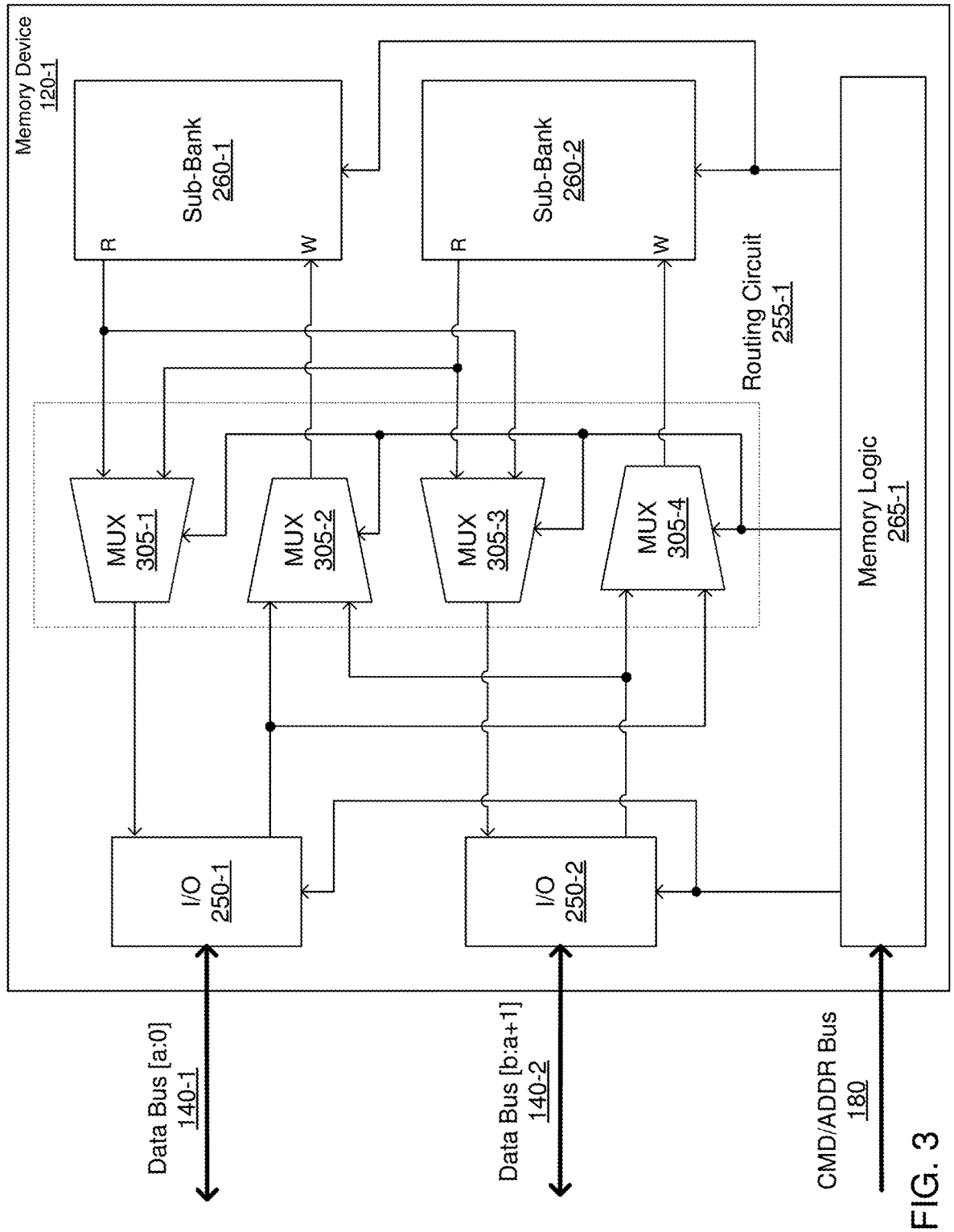
FIG. 3 illustrates a detailed view of a memory device showing how a routing circuit can be implemented with multiplexers, according to one embodiment.

FIG. 3 illustrates a detailed view of a memory device showing how a routing circuit can be implemented with multiplexers, according to one embodiment. As shown, routing circuit 255-1 of memory device 120-1 can be implemented as a set of multiplexers (MUX) 305-1, 305-2, 305-3, 305-4. The inputs of MUX 305-1 are cross-coupled to both the sub-bank 260-1 and the sub-bank 260-2 such that MUX 305-1 is configured to route read data from either sub-bank 260-1 or sub-bank 260-2. The inputs of MUX 305-2 are cross-coupled to both the I/O 250-1 (and data bus 140-1) and the I/O 250-2 (and data bus 140-2), such that MUX 305-2 is configured to route write data from either I/O 250-1 or I/O 250-2. The inputs of MUX 305-3 are cross-coupled to both the sub-bank 260-1 and the sub-bank 260-2 such that MUX 305-3 is configured to route read data from either sub-bank 260-1 or sub-bank 260-2. The inputs of MUX 305-4 are cross-coupled to both the I/O 250-1 (and data bus 140-1) and the I/O 250-2 (and data bus 140-2), such that MUX 305-4 is configured to route write data from either I/O 250-1 or I/O 250-2.

Memory logic 265-1 is coupled to and controls the logic state of each MUX. Thus, for example, memory logic 265-1 can configure MUX 305-1 to route read data from either sub-bank 260-1 or 260-2 into I/O 250-1. Memory logic 265-1 can configure MUX 305-2 to route write data from either I/O 250-1 or I/O 250-2 into sub-bank 260-1. Memory logic 265-1 can configure MUX 305-3 to route read data from either sub-bank 260-1 or 260-2 into I/O 250-2. Memory logic 265-1 can configure MUX 305-4 to route write data from either I/O 250-1 or I/O 250-2 into sub-bank 260-2. The routing circuit 255-1 thus allows data to be routed between any of the I/Os 250-1, 250-2 (and the associated data buses 140-1, 140-2) and any of the sub-banks 250-1, 250-2, depending on settings received from the memory logic 265-1. As will be described in greater detail below, memory logic 265-1 can determine the settings for the routing circuit based on information received from the memory controller 101 (not shown) via the CMD/ADDR bus 180.

Referring back to FIG. 2, the routing circuit 265-2 in device 120-2 and the routing circuit 215 in the controller 101 can also be implemented using multiplexers.

Referring again to FIG. 2, controller logic 225 is coupled to, and generates signals for controlling the operation of, the read queues 205, write queues 210, routing circuit 215, and I/O interfaces 220. Controller logic 225 also generates command, address, and other control information that is transmitted to memory devices 120 via control interface 230 and CMD/ADDR bus 180. For example, controller logic 225 may transmit commands that instruct the memory devices 120 to read data, write data, refresh the sub-banks 260, or calibrate an I/O interface 250. At the other end of the CMD/ADDR bus 180, memory logic 265-1 receives the commands from controller logic 225 via the CMD/ADDR bus 180, decodes the commands, and generates control signals for controlling device I/Os 250-1, 250-1, routing circuit 255-1, and sub-banks 260-1, 260-2 of memory device 120-1. Memory logic 265-2 also receives commands from controller logic 225 via the CMD/ADDR bus 180, decodes the commands, and generates control signals for controlling device I/Os 250-3, 250-4, routing circuit 255-2, and sub-banks 260-3, 260-4 of memory device 120-2. In one embodiment, memory device 120-1 and memory device 120-2 are each coupled to a different chip select signal, and the memory devices 120 use the logic state of the chip select signal to determine whether to decode a received command.

In one embodiment, controller logic 225 may provide command signals specifying different modes of operation for setting the routing circuits 255, which are transmitted as command signals to the memory logic 265 on the memory devices, via CMD/ADDR bus 180. Memory logic 265 decodes the signals and provides the routing settings to the routing circuit 255 prior to communication of read or write data. For example, the routing settings for the routing circuit 255 may be specified using one or more bits in a command field. In other embodiments, instead of using CMD/ADDR bus 180, the routing settings can be conveyed through sideband signals. In another embodiment, information received from controller logic 225 is used to set a mode register (not shown) in the memory logic 265. The memory logic then configures the routing circuit in accordance with the mode register. For example, in one mode set by the mode register, the routing circuit 255-1 routes signals directly between I/O 250-1 and sub-bank 260-1 and also between I/O 250-2 and sub-bank 260-2. In another mode set by the mode register, the routing circuit 255-1 is cross coupled and routes signals between I/O 250-1 and sub-bank 260-2 and also between I/O 250-2 and sub-bank 260-1.

Figure 4:
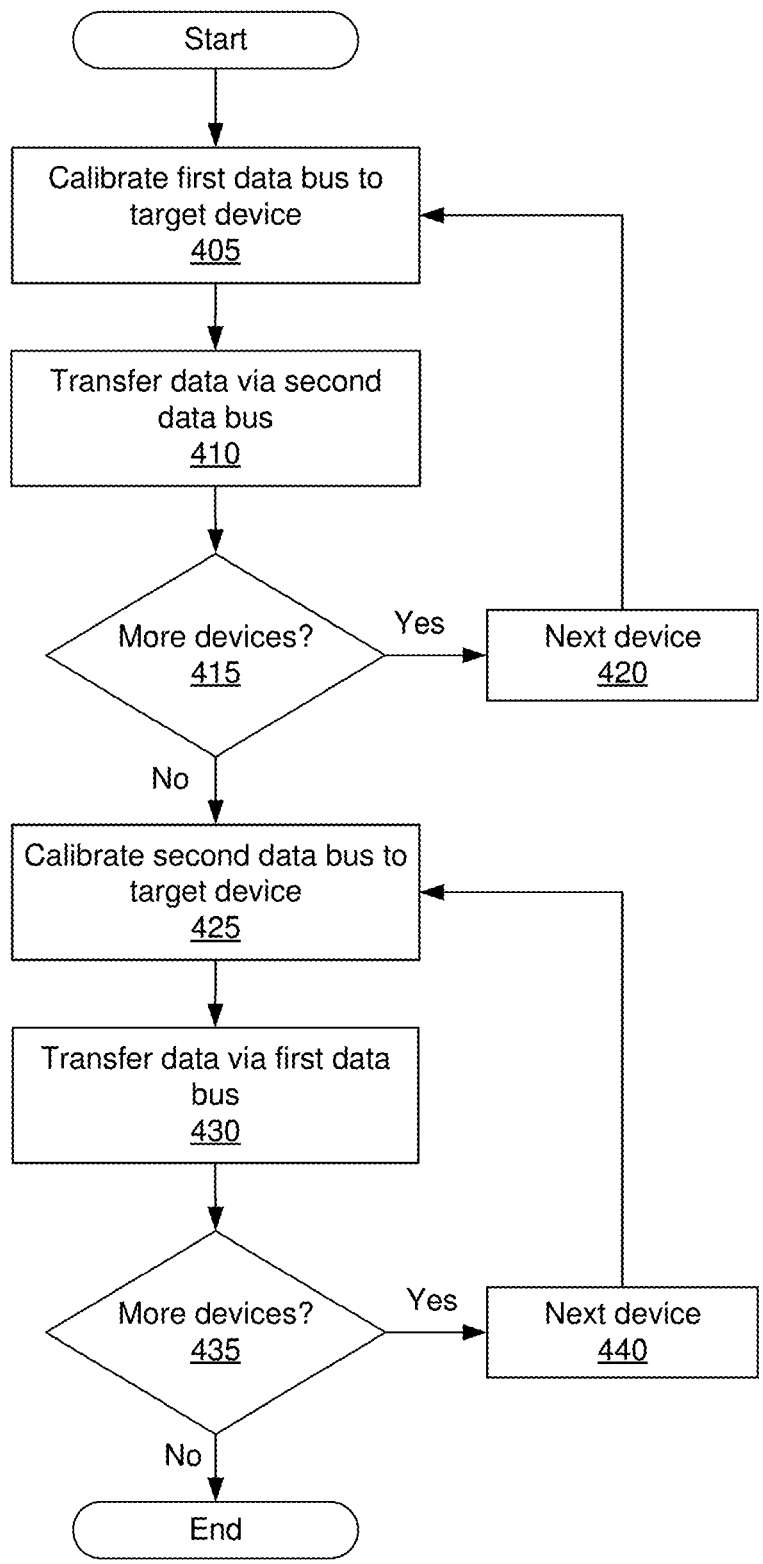
FIG. 4 is a flowchart illustrating how the memory system performs calibration operations for one data bus while transferring data between the controller and a memory device via another data bus, according to one embodiment.
Figure 5A:
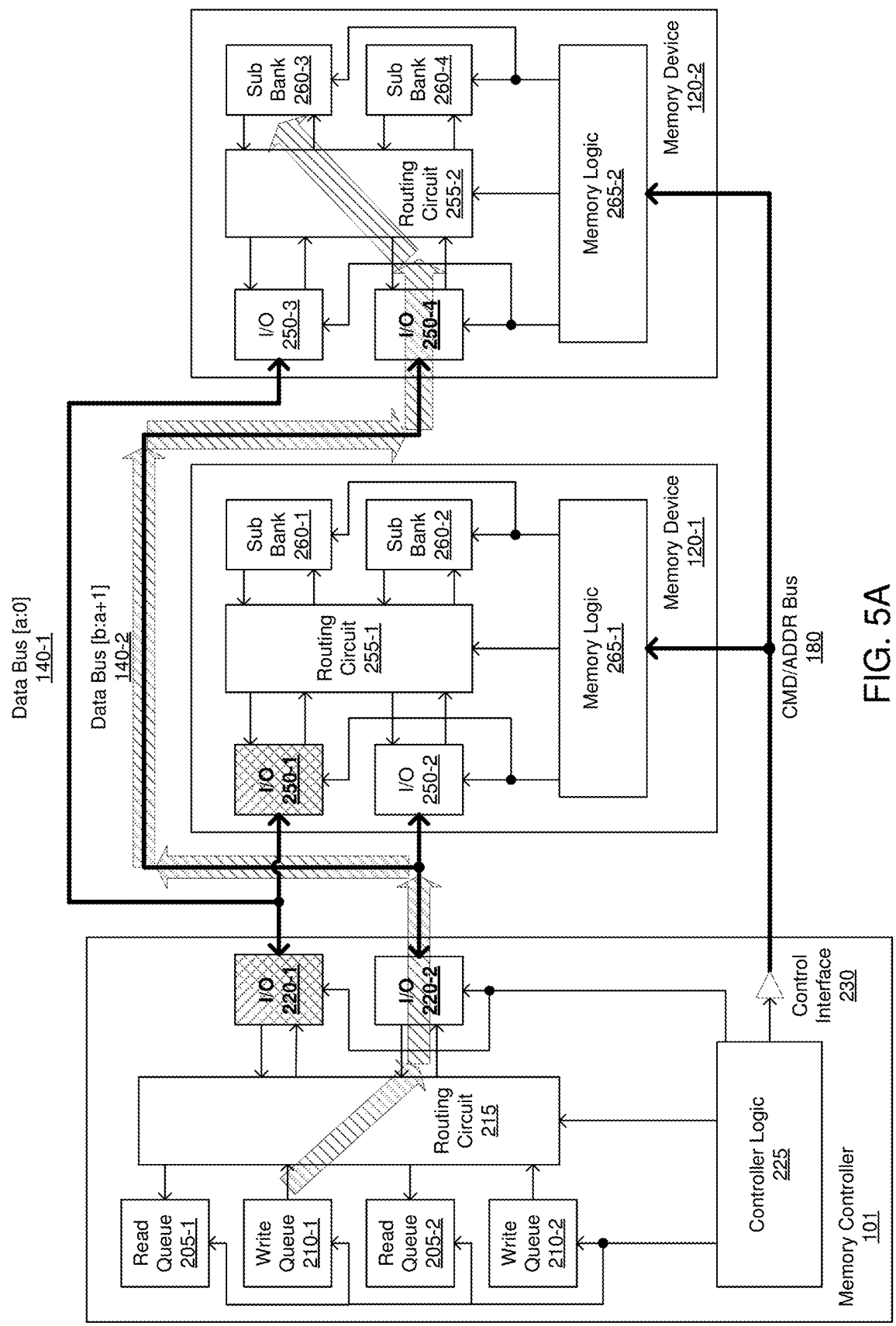
FIGS. 5A and 5B illustrate how the memory system performs calibration operations for one data bus while transferring data between the controller and a memory device via another data bus, according to one embodiment.
Figure 5B:
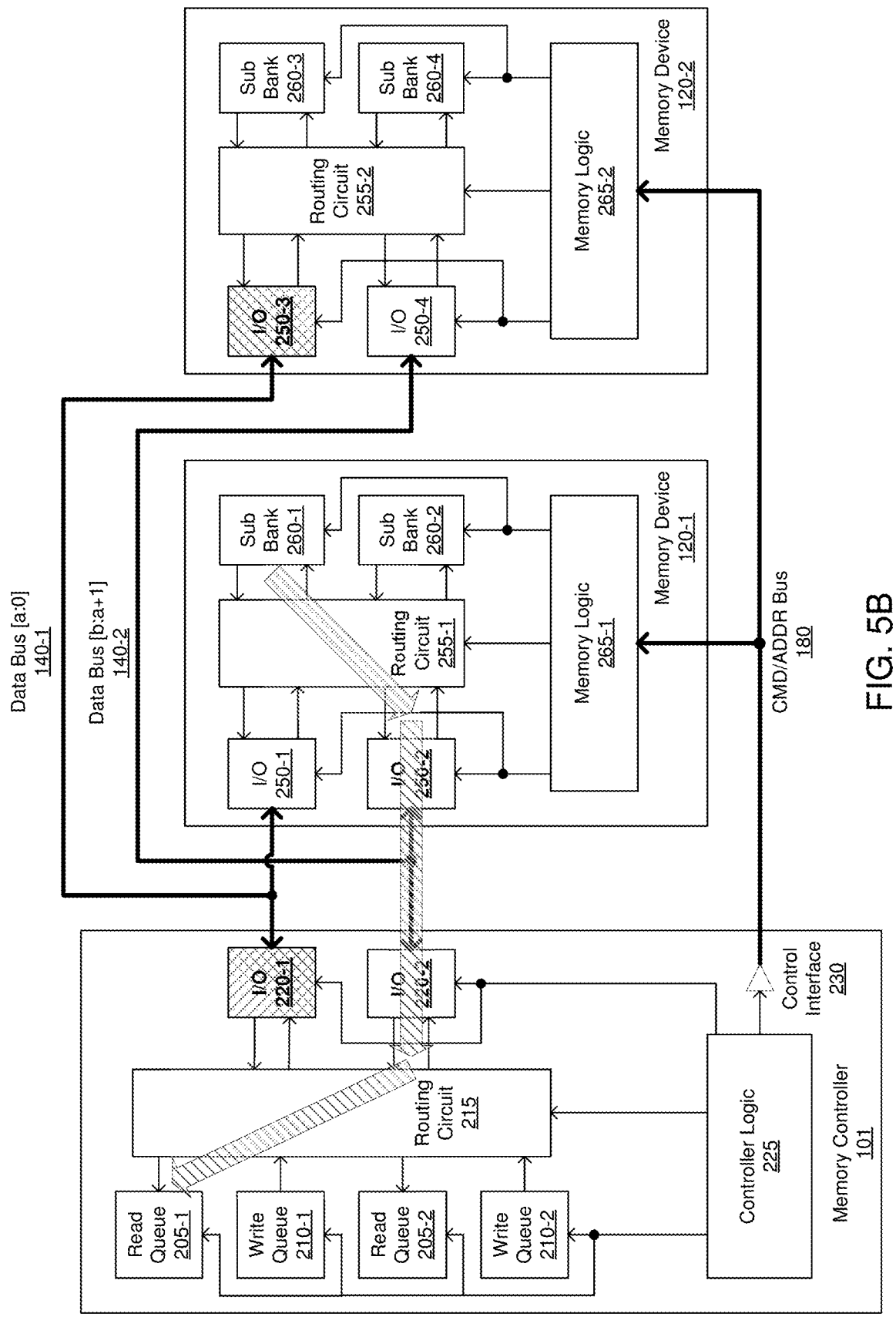

FIGS. 4, 5A, and 5B together illustrate how calibration operations are performed in a memory system for device interfaces that operate using one data bus while transferring data between the controller and a memory device via another data bus, according to one embodiment. FIG. 4 illustrates a method performed by the memory controller, according to one embodiment. At a high level, in steps 405-420, the memory controller calibrates a first data bus one device at a time. While calibrating the first data bus, the memory controller transfers data between the controller and a memory device via a second data bus. In steps 425-440, the memory controller calibrates a second data bus one device at a time. While calibrating the second data bus, the memory controller transfers data between the controller and a memory device via the first data bus. By calibrating one data bus while accessing data through another data bus, the method allows data access to continue during calibration operations. As a result, the performance degradation associated with periodically calibrating a data bus in a multi-rank configuration is reduced.

More specifically, in step 405, the memory controller 101 calibrates a first data bus between the memory controller and a memory device (the "target device"). The memory controller may initiate the calibration by sending a command to the target device via the CMD/ADDR bus 180. For example, referring to FIG. 5A, illustrated is how one data bus can be calibrated while data is accessed on another data bus, according to one embodiment. As shown in the example of FIG. 5A, memory device 120-1 is the target device and data bus 140-1 is the bus being calibrated with respect to memory device 120-1. Specifically, the system calibrates the data bus 140-1 between I/O 220-1 of memory controller 101 and I/O 250-1 of target memory device 120-1, which are shown with cross-hatched shading. The calibration operation takes data bus 140-1 offline and prevents the transfer of data between the controller 101 and any of the memory devices 120 via the same data bus 140-1.

In step 410, the memory controller 101 transfers data between the memory controller 101 and a memory device via a second data bus while the calibration operation of step 405 is ongoing. The second data bus is coupled to the target device and devices in other ranks of memory. Through the second data bus, data can be transferred between the memory controller 101 and any of the devices 120-1, 120-2 coupled to the second data bus. In an embodiment, the memory controller 101 transfers data with a memory device that is not the target device. In other words, the memory controller 101 transfers data with a memory device that is in a different rank of memory than the target device. For example, referring again to FIG. 5A, data bus 140-1 is being calibrated with respect to memory device 120-1. As the calibration is ongoing, memory controller 101 can transfer data from write queue 210-1 into sub-bank 260-3 of a different memory device 120-2 via a second data bus 140-2. The memory controller 101 can initiate the data access by generating a data transfer command and transmitting the command through the control interface 230 onto the CMD/ADDR bus 180. The command is received by the memory logic 265-2 of memory device 120-2, which decodes the command and performs the requested write action.

While not shown in the example of FIG. 5A, the memory controller 101 can access the full memory core (i.e. all sub-banks) of any memory device through a single data bus. For example, by adjusting the settings of the routing circuits 215, 255, the memory controller 101 can transfer data from any write queue 210 into any sub-bank 260 of any memory device 120 via a single data bus (e.g., data bus 140-2). The memory controller 101 can also transfer data from any sub-bank 260 of any device 120 into any read queue 205 via a single data bus (e.g., data bus 140-2).

As explained previously, data buses 140 are calibrated with respect to one memory device 120 at a time. If there are multiple memory devices 120 coupled to a single data bus (e.g., data bus 140-1), completely calibrating the data bus (e.g., data bus 140-1) requires that calibration operations for each data bus (e.g., data bus 140-1) be performed between the memory controller 101 and each of the memory devices 120. Referring back to FIG. 4, in step 415, the memory controller 101 determines if there are any more memory devices 120 coupled to the first data bus that have not yet been be calibrated. If so, it selects another memory device 120 as the target device. The memory controller 101 repeats the calibration 405 and data transfer 410 steps with respect to the new target device. For example, referring to FIG. 5B, illustrated is the calibration of parameters related to the transmission of data between the memory controller and another memory device, according to one embodiment. As shown, the new target device is memory device 120-2 and data bus 140-1 is the data bus being calibrated with respect to memory device 120-2. Specifically, the system calibrates the data bus 140-1 between I/O 220-1 of memory controller 101 and I/O 250-3 of memory device 120-2, which are shown with cross-hatched shading. The calibration operation takes data bus 140-1 offline and prevents the transfer of data between the controller and any of the memory devices 120 via data bus 140-1. The memory controller 101 then transfers data from sub-bank 260-1 into read queue 205-1 via data bus 140-2 that is not being calibrated, in the example shown in FIG. 5B.

Referring back to FIG. 4, if there are no more memory devices for which the first data bus (e.g., data bus 140-1 in this example) should be calibrated in step 415, then the controller 101 moves on to steps 425-440 to calibrate the second data bus. Steps 425-440 are similar to steps 405-420, but the calibration operations are now performed for the second data bus, which would be data bus 140-2 in the examples illustrated in FIGS. 5A and 5B. In step 425, the memory controller 101 calibrates the second data bus (e.g., data bus 140-2) between the memory controller 101 and a target memory device. In step 430, the memory controller 101 transfers data with a memory device via the first data bus while such calibration takes place. In step 435, the memory controller 101 determines if there are any more memory devices coupled to the second data bus with parameters that have not yet been be calibrated. If so, the memory controller 101 selects another memory device as the target device in step 440 and repeats steps 425-430-435. If not, the calibration operation is complete.

Figure 6:
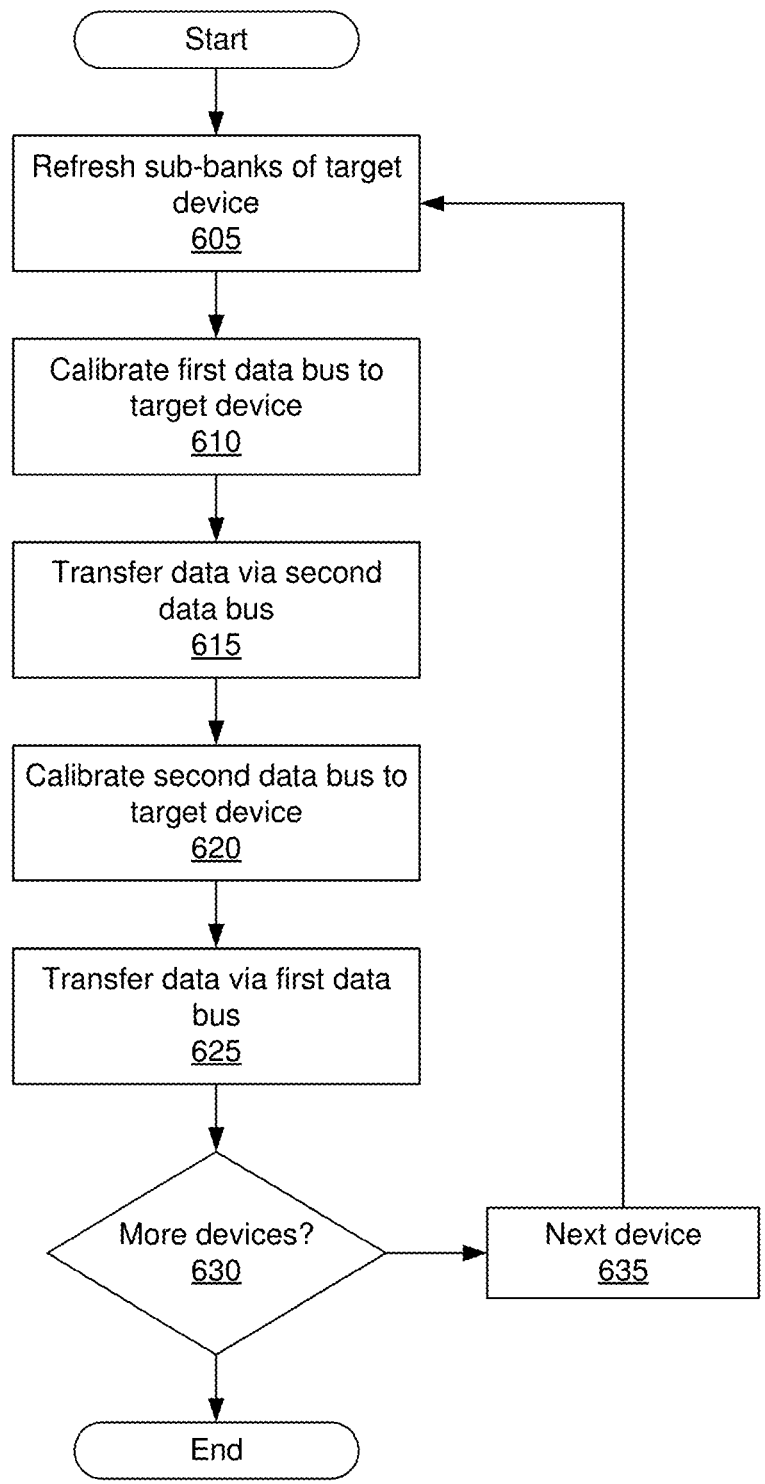
FIG. 6 is a flowchart illustrating how calibration operations, refresh operations, and data access can occur in parallel in the memory system, according to one embodiment.
Figure 7A:
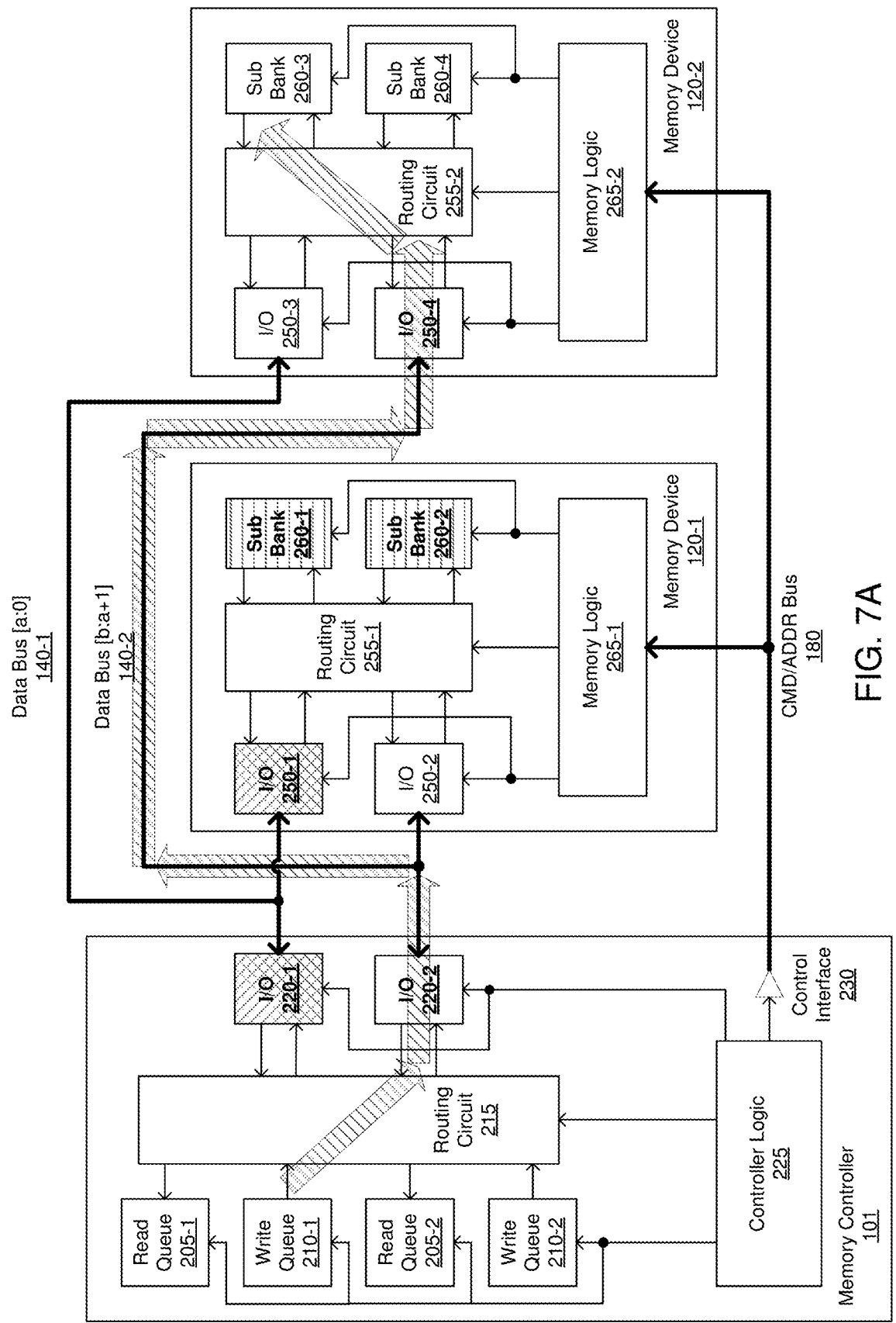
FIGS. 7A and 7B illustrate how calibration operations, refresh operations, and data access can occur in parallel, according to one embodiment.
Figure 7B:
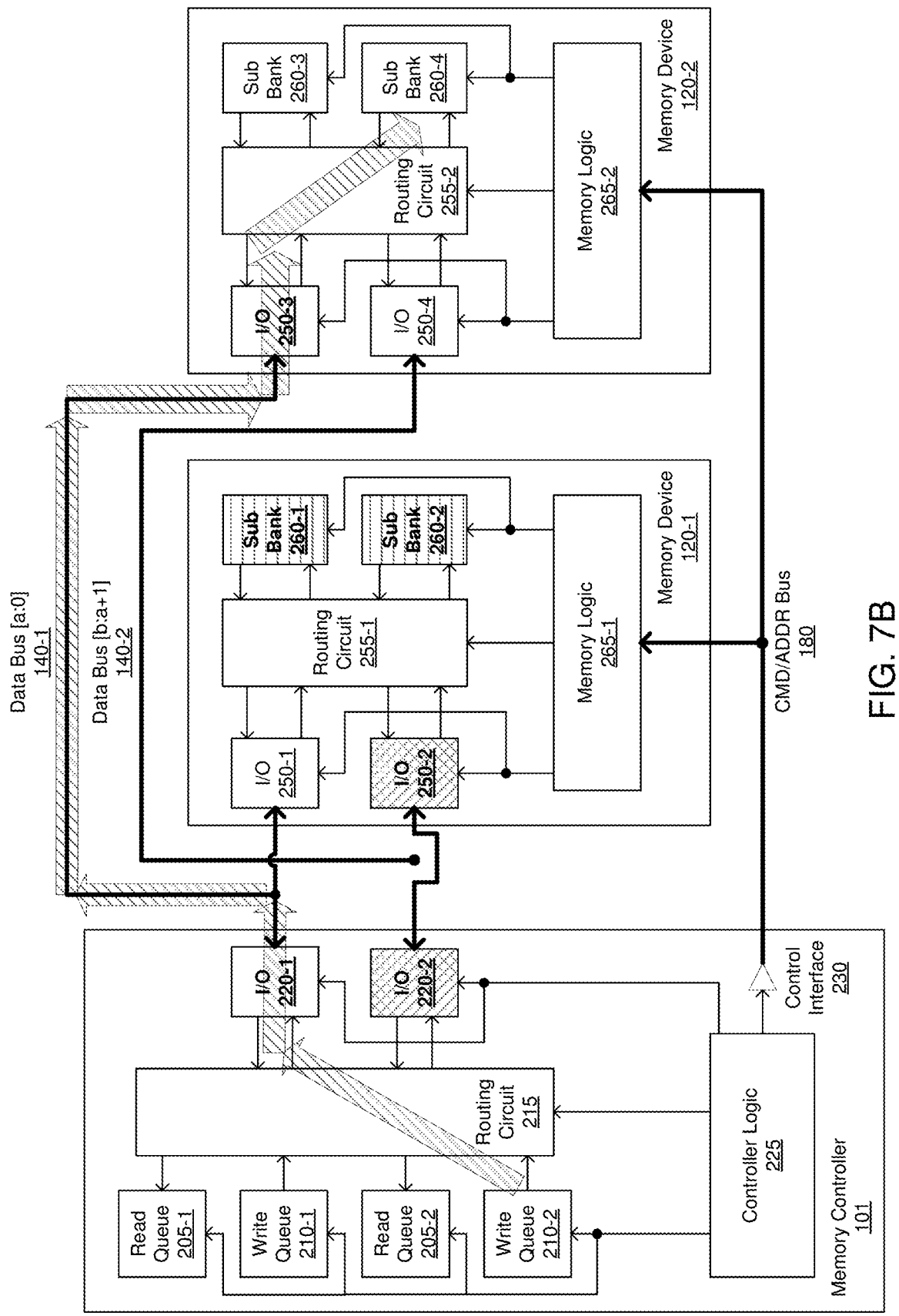

FIGS. 6, 7A, and 7B illustrate how calibration operations, core maintenance operations, and data access occur in parallel in one embodiment. Core maintenance operations include a variety of operations that affect the sub-banks 260 (i.e. memory core) of a memory device 120. Examples of core maintenance operations include: refresh operations for refreshing the cells of DRAM based memory devices; erase operations for erasing a block of non-volatile memory; anneal operations for alleviating device degradation in some types of memory by using heat to diffuse trapped charges, and program operations in non-volatile memory that are of long enough duration to block other core transactions. Because core maintenance operations prevent data access to the sub-banks 260 of a memory device 120, it is convenient to perform calibration operations at the same time. If the core maintenance operations are performed on only some of the sub-banks 260 and only one of the data buses is being calibrated, data traffic between the memory controller and the other sub-banks can be carried out through the non-calibrating bus. For purposes of clarity, FIGS. 6, 7A, and 7B will be described using embodiments where the core maintenance operation is a refresh operation. However, the description of these embodiments can be applied equally to any type of core maintenance operation.

In an embodiment, the memory controller 101 schedules refresh operations to occur in parallel with calibration operations. Specifically, FIG. 6 illustrates a method performed by the memory controller 101 to perform refresh operations in parallel with calibration operations and data access, according to one embodiment. In step 605, the memory controller 101 refreshes the sub-banks 260 of a target memory device. The controller 101 can initiate a refresh operation by sending a refresh command to the target memory device. The refresh command is decoded by the target device and causes the target device to refresh its sub-banks 260. For example, referring to FIG. 7A, illustrated is how calibration operations, refresh operations, and data access can occur in parallel, according to one embodiment. Memory device 120-1 is the target device in this example of FIG. 7A. The controller logic 225 generates a refresh command and transmits the refresh command through the control interface 230 onto CMD/ADDR bus 180. Memory logic 265-1 of the target memory device 120-1 decodes the refresh command and refreshes the data in sub-banks 260-1, 260-2, which are shown with horizontal line shading. In another embodiment, the sub-banks 260-1, 260-2 are refreshed one at a time. For example, the memory controller 101 may issue a command that only refreshes sub-bank 260-1. After sub-bank 260-1 is refreshed, the memory controller 101 may issue a second command that refreshes sub-bank 260-2.

Referring back to FIG. 6, in step 610, the memory controller 101 calibrates a first data bus between the memory controller 101 and the target memory device. The calibration occurs while the sub-banks of the target device are being refreshed. For example, referring again to FIG. 7A, memory device 120-1 is the target device and data bus 140-1 is the bus being calibrated. Specifically, the calibration operation calibrates data bus 140-1 between I/O 220-1 of memory controller 101 and I/O 250-1 of memory device 120-1, which are shown with cross-hatched shading in this example of FIG. 7A.

Referring back to FIG. 6, in step 615, the memory controller 101 transfers data between the memory controller 101 and a memory device via a second data bus. Because the sub-banks 260-1, 260-2 of the target device 120-1 are being refreshed, the memory controller cannot transfer data with the target device 120-1. However, the memory controller 101 can still transfer data with memory devices in other ranks of memory. For example, referring again to FIG. 7A, memory controller 101 can transfer data from write queue 210-1 into sub-bank 260-3 of memory device 120-2 via data bus 140-2 while data bus 140-1 is being calibrated with respect to I/O 250-1 of memory device 120-1.

In step 620, once the calibration operations of step 610 are complete, the memory controller 101 calibrates parameters relating to transmission of data via the second data bus between the memory controller 101 and the same target memory device as designated in step 610. For example, referring now to FIG. 7B, memory device 120-1 is still the target memory device and data bus 140-2 is now the bus being calibrated in this example. Specifically, the calibration operation calibrates data bus 140-2 between I/O 220-2 of memory controller 101 and I/O 250-2 of memory device 120-1, which are shown with cross-hatched shading.

Referring back to FIG. 6, in step 625, the memory controller 101 transfers data between the memory controller 101 and a memory device via the first data bus, which is not being calibrated. For example, referring again to FIG. 7B, the memory controller 101 can transfer data from write queue 210-2 into sub-bank 260-4 of memory device 120-2 via data bus 140-1, which is not being calibrated. Although not shown in FIG. 7B, memory controller 101 can transfer data with any sub-bank 260, so long as the sub-bank 260 is not in a memory device 120-1, 120-2 that is being refreshed in step 605.

Referring back to FIG. 6, in step 630, the memory controller 101 determines if there are any memory devices coupled to the first and second data buses that have not been refreshed. If there is a memory device that has not been refreshed yet, the memory controller 101 selects 635 another device as the target memory device for refresh and calibration and repeats steps 605-625 for the new target memory device. For example, referring again to FIG. 7B, the memory controller 101 can select memory device 120-2 as the new target device for refresh and calibration and send a refresh command to memory device 120-2 in order to refresh sub-banks 260-3, 260-4. If there are no more memory devices to refresh, the process is complete.

As described, FIGS. 6, 7A, and 7B illustrate one embodiment in which all the sub-banks 260 of a single memory device 120 are refreshed at the same time. In one embodiment, during calibration of a data bus, any number of sub-banks 260 across any number of memory devices 120 can be refreshed while data access is carried out with the non-refreshing sub-banks 260. For example, three sub-banks 260-1, 260-2, 260-3 can be refreshed, data bus 140-1 can be calibrated, and data can be transferred between the memory controller 101 and sub-bank 260-4 via data bus 140-2. As another example, one sub-bank 260-4 can be refreshed, data bus 140-1 can be calibrated, and data can be transferred between the memory controller 101 and any of sub-banks 260-1, 260-2, or 260-3.

Figure 8:
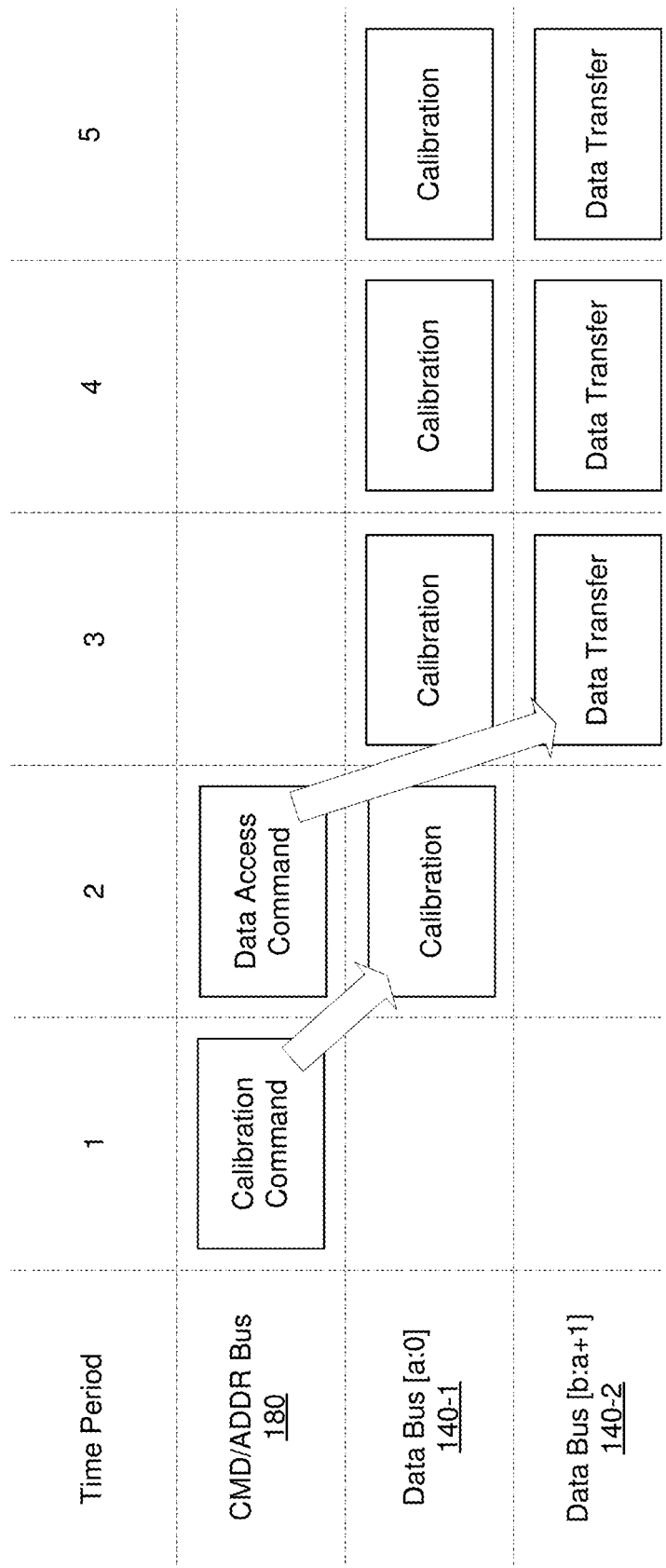
FIG. 8 is a timing diagram illustrating how the memory system performs calibration operations for one data bus while transferring data between the memory controller and a memory device via another data bus, according to one embodiment.

FIG. 8 is a timing diagram illustrating how the memory system performs calibration operations for one data bus while transferring data between the controller and a memory device via another data bus, according to one embodiment. In the example of FIG. 8, the data bus 140-1 is the bus to be calibrated with respect to memory device 120-1 for illustration purposes while data bus 140-2 is being used for data transfer with memory device 120-2. The timing diagram shows a series of commands sent from the memory controller 101 to the memory devices 120 via the CMD/ADDR bus and transactions occurring on two data buses 140-1, 140-2 as a result of those commands. The commands and transactions are broken down into individual periods of time, each of which represents an arbitrary length of time. For example, each time period can represent one or more clock cycles of a clock signal that is coupled to the memory controller 101 and the memory devices 120.

In time period 1, the memory controller 101 sends a calibration command via the CMD/ADDR bus 180 to memory device 120-1. The command initiates a calibration of data bus 140-1 between the memory controller 101 and a first memory device 120-1. As a result, starting from time period 2, data bus 140-1 is removed from service for memory access. Also in time period 2, the memory controller 101 sends a data access command (e.g. read or write command) via the CMD/ADDR bus 180 to a second memory device 120-2. The data access command may include information for setting the routing circuit 255-2 of the memory device 120-2 so that the proper sub-bank 260-3, 260-4 in memory device 120-2 can be coupled to data bus 140-2 for data access. The memory device 120-2 sets its routing circuit 255-2 in accordance with the command to couple the selected sub-bank 260-3, 260-4 in memory device 120-2 to data bus 140-2. Then, during time periods 3-5, the memory controller 101 transfers data with the second memory device 120-2 via the second data bus 140-2 while data bus 140-1 is being calibrated with respect to the I/O device(s) of memory device 120-1.

As shown by the embodiments, the disclosed multi-rank memory system is configured to allow data access during calibration operations. Through the use of routing circuits 255 in the memory devices 120 and the memory controller 101, the memory controller 101 can calibrate one data bus while accessing data through another data bus. By allowing data access to continue during calibration operations, the system mitigates the performance loss that is associated with timing calibration in conventional multi-rank memory systems.

Some portions of the detailed description, such as the descriptions of FIG. 4 and FIG. 6, refer to steps performed by the memory controller 101. It should be noted that in some embodiments, steps can be performed in a different order, steps can be performed concurrently with other steps, or some steps may not be performed at all. For example, referring back to FIG. 4, step 410 may occur before step 405 so that the memory controller 101 first initiates a transfer 410 of data via a second data bus. While the data transfer is ongoing, the memory controller 101 can then calibrate 405 a first data bus with respect to a target device while the data transfer is ongoing. As another example, referring back to FIG. 6, step 605 may occur after step 615 so that the sub-banks 260 are not refreshed 605 until both calibration 610 and data transfer 615 are in progress.

Also, referring back to FIG. 1, the embodiments have been described in detail with respect to the operations of the memory controller 101, data buses 140-1, 140-2 and the memory devices 120-1, 120-2. The principles of the described embodiments in FIG. 2 through FIG. 8 also apply to the other data buses 145-1, 145-2 and the other memory devices 120-3, 120-4 of FIG. 1 so that calibration operations can occur across multiple data buses at the same time. For example, the memory controller 101 can calibrate multiple data buses (e.g., data bus 140-1 and data bus 145-1), while at the same time transferring data with the memory devices 120 through the other data buses (e.g., data bus 140-2 and data bus 145-2).

Upon reading this disclosure, those of ordinary skill in the art will appreciate still alternative structural and functional designs for accessing memory during calibration operations through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the spirit and scope of the disclosure as defined in the appended claims.

What is claimed is:

1. A memory controller, comprising:
a first data interface circuit to couple to a first memory device via a first data bus, the first memory device including a plurality of first sub-banks of memory; and
a second data interface circuit to couple to the first memory device via a second data bus;
wherein the memory controller is configured to transmit to the first memory device a first calibration command and a first refresh command to refresh a first sub-bank of the plurality of first sub-banks, and while the first sub-bank is being refreshed responsive to the first refresh command and a first calibration operation is performed on the first data interface circuit responsive to the first calibration command, data is transferred, via the second data interface, between the memory controller and a second sub-bank from the plurality of first sub-banks that is not being refreshed.

2. The memory controller of claim 1, further comprising:
a control interface to couple to the first memory device via a command bus;
wherein the memory controller transmits the first refresh command and the first calibration command via the control interface, and
wherein the second data bus transfers the data in response to the memory controller transmitting a first data transfer command to the first memory device via the control interface.

3. The memory controller of claim 1, wherein the memory controller transmits to a second memory device that includes a plurality of second sub-banks, a second refresh command, at least one of the plurality of second sub-banks being refreshed while the first sub-bank is refreshed.

4. The memory controller of claim 3, wherein all of the plurality of second sub-banks are refreshed while the first sub-bank is refreshed.

5. The memory controller of claim 1, wherein the memory controller transmits a second calibration command to the first memory device to calibrate the second data interface circuit, and while the a second calibration operation is performed on the second data interface circuit the first data interface transfers data from one of the plurality of first sub-banks via the first data bus.

6. The memory controller of claim 1, further comprising:
a plurality of read queues to store data received from the first memory device;
a plurality of write queues to store data to be transmitted to the memory device;
a routing circuit to route data between the plurality of read queues, the plurality of write queues, and the first data interface circuit, and to route data between the plurality of read queues, the plurality of write queues, and the second data interface circuit, the routing circuit providing full access to the plurality of read queues and the plurality of write queues from both the first data interface circuit and the second data interface circuit.

7. The memory controller of claim 1, further comprising:
a controller logic configured to transmit to the first memory device a routing setting that sets a routing configuration of a configurable routing circuit included in the first memory device, the configurable routing circuit to route data between the plurality of first sub-banks of memory and the first data bus and to route data between the plurality of first sub-banks of memory and the second data bus.

8. The memory controller of claim 7, wherein the controller logic transmits a command that includes the routing setting to the first memory device.

9. The memory controller of claim 7, wherein the controller logic transmits a sideband signal to the first memory device, the sideband signal including the routing setting.

10. The memory controller of claim 6, wherein the routing circuit allows data to be configurably routed between the first data interface circuit and any of the plurality of read queues and the plurality of write queues, and allows data to be configurably routed between the second data interface circuit and any of the plurality of read queues and the plurality of write queues.

11. The memory controller of claim 10, wherein the routing circuit comprises a plurality of multiplexors cross-coupled between the plurality of read queues, the plurality of write queues, the first data interface circuit, and the second data interface circuit.

12. The memory controller of claim 1, wherein the first calibration operation is for tuning of one or more calibration parameters related to transmission of or reception of data via the first data interface circuit.

13. The memory controller of claim 12, wherein the one or more calibration parameters include one or more of receiver sample phase, transmitter drive phase, receiver offset, receiver current bias, receiver termination impedance, transmit supply voltage, transmit drive swing voltage or transmit termination impedance.

14. A method of operation in a memory controller including a first data interface circuit to couple to a first memory device via a first data bus where the first memory device includes a plurality of first sub-banks of memory, and a second data interface circuit to couple to the first memory device via a second data bus, the method comprising:
transmitting, to the first memory device, a first refresh command to refresh a first sub-bank of the plurality of first sub-banks included in the first memory device;
transmitting, to the first memory device, a first calibration command to calibrate the first data bus;
performing a first calibration operation on the first data interface in response to the first calibration command while the first sub-bank is being refreshed in response to the first refresh command; and
transferring, with the second data interface, data between the memory controller and a second sub-bank from the plurality of first sub-banks in response to the memory controller transmitting a first data transfer command to the first memory device.

15. The method of claim 14, further comprising:
transmitting, to a second memory device that includes a plurality of second sub-banks, a second refresh command, at least one of the plurality of second sub-banks refreshed while the first sub-bank of the plurality of first sub-banks is refreshed.

16. The method of claim 15, wherein all of the plurality of second sub-banks are refreshed while the first sub-bank of the plurality of first sub-banks is refreshed.

17. The method of claim 14, further comprising:
transmitting, to the first memory device, a second calibration command to calibrate the second data interface circuit; and
transferring, with the first data interface circuit, data from at least one of the plurality of first sub-banks while the second calibration operation is performed.

18. The method of claim 14, wherein the first calibration operation is for tuning of one or more calibration parameters related to transmission of or reception of data via the first data interface circuit.

19. The method of claim 18, wherein the one or more calibration parameters include one or more of receiver sample phase, transmitter drive phase, receiver offset, receiver current bias, receiver termination impedance, transmit supply voltage, transmit drive swing voltage or transmit termination impedance.

20. A memory controller, comprising:
a first data interface means for coupling to a first memory device via a first data bus, the first memory device including a plurality of first sub-banks of memory; and
a second data interface means for coupling to the first memory device via a second data bus;
wherein the memory controller is configured to transmit to the first memory device a first calibration command and a first refresh command to refresh a first sub-bank of the plurality of first sub-banks, and while the first sub-bank is being refreshed responsive to the first refresh command and a first calibration operation is performed on the first data interface circuit responsive to the first calibration command, data is transferred, via the second data interface, between the memory controller and a second sub-bank from the plurality of first sub-banks that is not being refreshed.

* * * * *